United States Patent
Kistenmacher et al.

(10) Patent No.: US 6,384,111 B1
(45) Date of Patent: *May 7, 2002

(54) POLYMERS CONTAINING CARBOXYL GROUPS AND POLYALKYLENE ETHER SIDE-CHAINS AS ADDITIVES IN MINERAL BUILDING MATERIALS

(75) Inventors: Axel Kistenmacher, Ludwigshafen; Paul Klingelhofer, Mannheim; Johannes Perner; Markus Hartmann, both of Neustadt; Alfred Ruland, Schriesheim, all of (DE)

(73) Assignee: BASF Aktiengesellschaft, Ludwigshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,167
(22) PCT Filed: Dec. 19, 1996
(86) PCT No.: PCT/EP97/07205
§ 371 Date: Jun. 21, 1999
§ 102(e) Date: Jun. 21, 1999
(87) PCT Pub. No.: WO98/28353
PCT Pub. Date: Jul. 2, 1998

(30) Foreign Application Priority Data

Dec. 20, 1996 (DE) .......... 196 53 524

(51) Int. Cl.$^7$ ........ C08F 220/04; C08F 220/28; C08F 220/58; C04B 24/26
(52) U.S. Cl. .......... 524/5; 524/414; 524/417; 524/555; 524/556; 524/558; 526/193; 526/233; 526/304; 526/307.4; 526/318.41; 526/318.5; 526/320
(58) Field of Search .......... 524/5, 115, 414, 524/558, 556, 548, 417, 555; 526/307.4, 333, 304, 193, 233, 318.41, 318.5, 320

(56) References Cited

U.S. PATENT DOCUMENTS

| | | | |
|---|---|---|---|
| 3,952,805 A | 4/1976 | Persinski et al. | |
| 4,042,407 A | 8/1977 | Natsuume | |
| 4,473,406 A | 9/1984 | Bradley et al. | |
| 4,586,960 A | 5/1986 | Iizuka et al. | |
| 4,774,303 A | 9/1988 | Denzinger et al. | |
| 4,808,641 A * | 2/1989 | Yagi et al. | 524/5 |
| 4,862,930 A | 9/1989 | Sauerbruch | |
| 4,883,535 A | 11/1989 | Hamaguchi et al. | |
| 4,906,298 A | 3/1990 | Natsuume et al. | |
| 4,963,190 A | 10/1990 | Mizunuma et al. | |
| 5,100,984 A * | 3/1992 | Bürge et al. | 526/240 |
| 5,158,996 A * | 10/1992 | Valentl | 524/5 |
| 5,185,039 A | 2/1993 | Hamaguchi et al. | |
| 5,350,450 A | 9/1994 | Hamabe et al. | |
| 5,369,198 A * | 11/1994 | Albrecht et al. | 526/240 |
| 5,432,212 A | 7/1995 | Honda et al. | |
| 5,661,206 A * | 8/1997 | Tanaka et al. | 524/378 |
| 5,674,316 A | 10/1997 | Izumi et al. | |
| 5,753,744 A * | 5/1998 | Darwin et al. | 524/549 |
| 5,798,425 A * | 8/1998 | Albrecht et al. | 526/271 |

FOREIGN PATENT DOCUMENTS

| | | | |
|---|---|---|---|
| EP | 537870 | * 4/1993 | ......... C08F/220/04 |
| EP | 0 537 870 A1 | 4/1993 | |
| GB | 2 221 673 | 2/1990 | |
| GB | 2 221 673 A | 2/1990 | |
| JP | 58-74552 | * 5/1983 | ........... C04B/13/24 |

OTHER PUBLICATIONS

Derwent Abstract, AN 93–127731/16, EP 537870–A1, Oct. 18, 1991.

* cited by examiner

*Primary Examiner*—David W. Wu
*Assistant Examiner*—Kelechi C. Egwim
(74) *Attorney, Agent, or Firm*—Oblon, Spivak, McClelland, Maier & Neustadt, P.C.

(57) ABSTRACT

Additives for mineral building materials made of water-soluble or water-dispersible polymers containing a carboxyl group, optionally in latent form, and at least one side chain of formula I:

$$-X-Y-[O-(Alk-O)_n-R]_k \qquad (I)$$

wherein k is 1, 2, 3 or 4;

Y is a $C_1$–$C_4$-alkylene unit, or a single bond if X is a carbonyl group, or when k≠1, can also be $$-CH_2-[CH]_{k-1}-CH_2-$$

X is

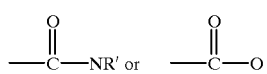

wherein R' is hydrogen, $C_1$–$C_{20}$-alkyl, $C_5$–$C_{10}$-cycloalkyl, $C_6$–$C_{20}$-aryl, $C_1$–$C_{20}$-alkanoyl, $C_7$–$C_{21}$-aroyl, $(Alk-O)_n$—R or -Alk'-O$(Alk-O)_n$—R;
Alk is $C_2$–$C_4$-alkylene;
Alk' is $C_1$–$C_4$-alkylene optionally having an OH group;
n is a number in the range from 15 to 300; and
R is hydrogen, $C_1$–$C_{20}$-alkyl, $C_5$–$C_8$-cycloalkyl, $C_6$–$C_{20}$-aryl, $C_1$–$C_{20}$-alkanoyl or $C_7$–$C_{21}$-aroyl; are obtained by polymerization of ethylenically unsaturated monomers in the presence of phosphorus-containing compounds and, if appropriate, subsequent polymer-analogous conversion.

29 Claims, No Drawings

POLYMERS CONTAINING CARBOXYL GROUPS AND POLYALKYLENE ETHER SIDE- CHAINS AS ADDITIVES IN MINERAL BUILDING MATERIALS

The present invention relates to the use of polymers containing carboxyl groups and polyalkylene ether side chains as additives in mineral building materials.

For the purposes of the present invention, mineral building materials are preparations comprising as essential constituents mineral binders such as lime and/or, in particular, cement and also, as aggregates, sands, gravels, crushed rock or other fillers, e.g. natural or synthetic fibers. The mineral building materials are generally produced by mixing the mineral binders and the aggregates together with water to convert them into a ready-to-use preparation which when left to itself hardens with time both in air and under water to give a stone-like material.

To obtain the desired processing property profile of the ready-to-use preparation it is generally necessary to use a larger amount of water than that required for the subsequent hydration or curing process. This is the case particularly when a high flowability of the ready-to-use preparation is desired, for example when it is to be pumped. The excess water which evaporates later forms voids in the building component and these lead to a significant worsening of the mechanical properties and resistances of the building component.

To reduce the amount of excess water while maintaining a prescribed property profile, additives which are generally referred to as water reducing agents, flow improvers and fluidizers are generally added to the ready-to-use preparation. According to the prior art, for example, the following compounds are recommended as fluidizers for ready-to-use preparations of mineral building materials:

Naphthalenesulfonic acid-formaldehyde condensates (EP-A 402 319), melamine-formaldehyde polycondensates (EP-A 402 319), ligninesulfonates (EP-A 402 319) and also homopolymers and copolymers of carboxylic acids and dicarboxylic acids with styrene (EP-A 306 449 and U.S. Pat. No. 3,952,805) or isobutene or diisobutene (DE-A 37 16 974, EP-A 338 293, DE-A 39 25 306, U.S. Pat. No. 4,586,960, U.S. Pat. No. 4,042,407 and U.S. Pat. No. 4,906,298). EP 97 513 describes the use of copolymers of unsaturated carboxylic acids and hydroxyalkyl esters of unsaturated carboxylic acids as plasticizer additives in cement-containing compositions.

The use of copolymers comprising carboxylic acid monomers and polyalkylene oxide esters of acrylic acid and methacrylic acid in copolymerized form as fluidizers for cement-containing compositions is known from DE-A 44 20 444. However, the fluidizers have to be used together with antifoams based on alkylene polyethers in order to achieve the desired use properties.

The use of crosslinked polymers of ethylenically unsaturated polyoxialkylene ethers, multiply unsaturated alkenylethers and maleic anhydride as fluidizers for cement-containing compositions is described in EP 619 277. However, the polyfunctional compounds which are absolutely necessary for the desired properties are complicated to prepare and make the product more expensive.

DE-A 195 13 126 describes copolymers based on oxialkylene glycol-alkenyl ethers and unsaturated dicarboxylic acid derivatives which comprise at least one further monomer selected from among multiply unsaturated monomers or diesters of ethylenically unsaturated carboxylic acids in copolymerized form. Such terpolymers are likewise suitable for fluidizing cement-containing compositions.

DE-A 4304 109 and EP-A 610 699 describe copolymers based on maleic acid derivatives and vinyl monomers with the maleic acid derivatives including maleimides and monoamides of maleic acid and also, as an essential component, a monoester of maleic acid and a polyalkylene alcohol. Such polymers are likewise suitable as fluidizers for cement-containing mineral building materials. However, it appears to be desirable to further reduce the water/cement ratio of 0.5 given in the examples for flowable preparations in order to achieve a higher strength of the set concrete.

EP-A 537 870 describes copolymers of ethylenically unsaturated carboxylic acids and/or sulfonic acids with monomers containing polyether functions. Monomers described are, for example, allyl ethers of polyethylene glycol having up to 11 ethylene oxide units. The polymers are preferably prepared in the presence of sodium hypophosphite.

In summary, it can be said that the additives known from the prior art for mineral building materials are still in need of improvement. In particular, their fluidizing action at low water/binder ratios is generally still not sufficient or is retained for only a short time. Although a larger amount of the fluidizer can partially compensate for this deficiency, it not only makes such a procedure uneconomical but also results in considerable deterioration of the achievable mechanical strength or at least unacceptable slowing of the setting rate.

It is an object of the present invention to provide additives for mineral building materials which, particularly in respect of their fluidizing action, have advantages over the known additives for mineral building materials. In particular, it is desirable that in the case of low water/binder ratios there is no need to accept disadvantages in the setting behavior or in respect of the strength of the set building materials.

We have found that this object is achieved by a series of water-soluble or water-dispersible polymers which have carboxyl groups and side chains having a polyether structure and have advantageous properties as additives for mineral building materials if they are obtained by polymerization of ethylenically unsaturated monomers containing carboxyl groups and/or side chains having a polyether structure in the presence of phosphorus-containing compounds. Alternatively, such polymers can be obtained by polymer-analogous reaction of polymers which have been prepared in the presence of phosphorus-containing compounds and contain reactive groups.

The present invention accordingly provides for the use of water-soluble or water-dispersible polymers containing carboxyl groups, if desired in latent form, and side chains of the formula I,

  (I), where k is 1, 2, 3 or 4,

Y is a single bond or a $C_1$–$C_4$-alkylene unit or, when k≠1, can also be

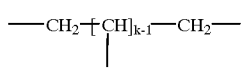

X is a single bond or a carbonyl group or, when Y is not a single bond, can also be O, NR',

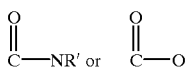

where R' is hydrogen, $C_1$–$C_{20}$-alkyl, $C_5$–$C_{10}$-cycloalkyl, $C_6$–$C_{20}$-aryl, $C_1$–$C_{20}$-alkanoyl, $C_7$–$C_{21}$-aroyl, (Alk-O)$_n$—R or -Alk'-O(Alk-O)$_n$—R, Alk is $C_2$–$C_4$-alkylene, Alk' is $C_1$–$C_4$-alkylene which may also bear an OH group, n is a number in the range from 1 to 300, where $n \geq 12$ when X is a single bond and $n \geq 2$ when X is a carbonyl group and Y is a single bond, R is hydrogen, $C_1$–$C_{20}$-alkyl, $C_5$–$C_8$-cycloalkyl, $C_6$–$C_{20}$-aryl, $C_1$–$C_{20}$-alkanoyl or $C_7$–$C_{21}$-aroyl, where the polymers are obtainable by free-radical copolymerization of ethylenically unsaturated monomers A containing carboxyl groups and ethylenically unsaturated monomers B having side chains of the formula I and also, if desired, further monomers C in the presence of from 0.1 to 50 % by weight, based on the monomers to be polymerized, of phosphorus-containing compounds, or by free-radical copolymerization of ethylenically unsaturated monomers containing reactive functional groups, if desired together with monomers A and/or B and, if desired, further monomers C, in the presence of from 0.1 to 50 % by weight, based on the monomers to be polymerized, of phosphorus-containing compounds and subsequent conversion of at least part of the reactive functional groups into side chains of the formula I and/or carboxyl groups, as additives in mineral building materials.

The present invention further provides the polymers used if $n \geq 5$ when X is a carbonyl group and $n > 12$ when X is a single bond. The present invention also provides a process for preparing these polymers.

In the following, $C_1$–$C_{20}$-alkyl is a linear or branched, saturated hydrocarbon chain having up to 20, preferably from 1 to 10, carbon atoms, e.g. methyl, ethyl, n-propyl, i-propyl, n-butyl, s-butyl, i-butyl, t-butyl, n-pentyl, s-pentyl, neopentyl, 1-, 2-, 3-methylpentyl, n-hexyl, 2-ethylhexyl, n-octyl, 3-propylheptyl, 1-decyl, 1-dodecyl, etc.

$C_1$–$C_4$-Alkylene includes, for example, methylene, 1,2-ethylene, 1,2-propylene, 1,3-propylene, 1,2-butylene, 1,3-butylene, 1,4-butylene and 2,3-butylene. The same applies to $C_2$–$C_4$-alkylene.

$C_5$–$C_{10}$-Cycloalkyl is a cycloaliphatic radical having a total of from 5 to 10 carbon atoms and selected from among cyclopentyl, cyclohexyl, cycloheptyl and cyclooctyl, each of which may be unsubstituted or substituted by 1, 2, 3 or 4 $C_1$–$C_4$-alkyl groups, in particular by methyl groups.

$C_6$–$C_{20}$-Aryl is phenyl or naphthyl, each of which may be unsubstituted or substituted by 1, 2, 3 or 4 $C_1$–$C_{10}$-alkyl groups, $C_1$–$C_4$-alkyloxy groups, hydroxy groups, halogen, e.g. chlorine, and can have up to 20 carbon atoms.

$C_7$–$C_{20}$-Aralkyl is an aryl group which is bonded via a $C_1$–$C_4$-alkylene unit and can have from 7 to 20 carbon atoms, e.g. benzyl or ethylphenyl. $C_1$–$C_{20}$-Alkanoyl is a radical derived from an aliphatic carboxylic acid and thus includes formyl and those alkyl radicals which are bonded via a carbonyl group. $C_7$–$C_{21}$-Aroyl corresponds to $C_7$–$C_{21}$-arylcarbonyl and is an aryl radical which is bonded via a carbonyl group and is thus derived from derivatives of benzoic acid and napthoic acid.

Carboxyl groups are not only carboxylic acid groups (COOH) but also neutralized carboxylic acid groups (COO⁻). Of equal utility to the carboxyl groups are anhydride groups since these are present as carboxyl groups under use conditions (building material preparations are generally alkaline and promote the hydrolysis of the anhydride groups). Accordingly, polymers having anhydride groups as carboxyl groups in latent form in place of the carboxyl groups are likewise subject matter of the present invention.

The formulae below are to be interpreted such that the carbonyl carbon is connected to the polymer chain, possibly via a methylene group, and the heteroatom is connected to Y:

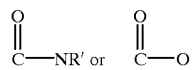

Reactive functional groups include all groups which can react with water, ammonia, hydroxyl groups of alcohols and $NH_2$ groups of primary amines to form a bond. They include, in particular, oxirane groups and cyclic anhydride groups.

For the purposes of the present invention, phosphorus-containing compounds are both inorganic and organic phosphorus compounds. The inorganic phosphorus compounds to be used according to the present invention preferably include the oxo acids of phosphorus and their salts which are soluble or dispersible in the reaction medium, preferably their alkali metal, alkaline earth metal or ammonium salts.

Examples of suitable inorganic phosphorus compounds are: phosphinic acid ($H_3PO_2$) and the salts derived therefrom such as sodium phosphinate (monohydrate), potassium phosphinate, ammonium phosphinate; hypodiphosphonic acid ($H_4P_2O_4$) and the salts derived therefrom; phosphonic acid ($H_3PO_3$) and the salts derived therefrom such as sodium hydrogen phosphonate, sodium phosphonate, potassium hydrogen phosphonate, potassium phosphonate, ammonium hydrogen phosphonate, ammonium phosphonate; diphosphonic acid ($H_4P_2O_5$) and the diphosphonates derived therefrom; hypodiphosphoric acid ($H_4P_2O_6$) and the hypodiphosphates derived therefrom; phosphoric acid ($H_3PO_4$) and the dihydrogen phosphates, hydrogen phosphates and phosphates derived therefrom; diphosphoric acid ($H_4P_2O_7$) and the diphosphates derived therefrom and also polyphosphoric acids and their salts such as sodium triphosphate.

The polymers of the present invention are preferably prepared in the presence of phosphinic acid ($H_3PO_2$) or the salts derived therefrom such as sodium phosphinate monohydrate, potassium phosphinate, ammonium phosphinate and/or phosphonic acid ($H_3PO_3$) or the salts derived therefrom, e.g. sodium hydrogen phosphonate, sodium phosphonate, potassium hydrogen phosphonate, potassium phosphonate, ammonium hydrogen phosphonate and ammonium phosphonate. Particular preference is given to sodium phosphinate monohydrate and/or phosphonic acid.

Phosphorus-containing compounds also include organophosphorus compounds such as urea phosphate, methanediphosphonic acid, propane-1,2,3-triphosphonic acid, butane-1,2,3,4-tetraphosphonic acid, polyvinylphosphonic acid, 1-aminoethane-1,1-diphosphonic acid, diethyl (1-hydroxyethyl)phosphonate, diethyl hydroxymethylphosphonate, 1-amino-1-phenyl-1,1-diphosphonic acid, aminotrismethylenetriphosphonic acid, ethylenediaminotetramethylenetetraphosphonic acid, ethylenetriaminopentamethylenepentaphosphonic acid, 1-hydroxyethane-1,1-diphosphonic acid, phosphonoacetic and phosphonopropionic acids and their salts, diethyl phosphite, dibutyl phosphite, diphenyl phosphite, triethyl phosphite, tributyl phosphite, triphenyl phosphite and tributyl phosphate.

Also suitable are ethylenically unsaturated phosphorus compounds such as vinyl phosphonate, methyl vinylphosphonate, ethyl vinylphosphonate, vinyl phosphate, allyl phosphonate or allyl phosphate.

Preferred organophosphorus compounds are 1-hydroxyethane-1,1-diphosphonic acid and its disodium and tetrasodium salts, aminotrismethylenetriphosphonic acid and its pentasodium salt and ethylenediaminotetramethylenetetraphosphonic acid and its salts.

It is often advantageous to combine a plurality of phosphorus compounds, for example sodium phosphinate monohydrate with phosphonic acid, phosphonic acid with disodium 1-hydroxyethane-1,1-diphosphonate and/or aminotrimethylenetriphosphonic acid and/or 1-hydroxyethane-1,1-diphosphonic acid. They can be mixed with one another in any ratio and used in the polymerization.

The amount of phosphorus-containing compound is, based on the monomers to be polymerized, generally from 0.1 to 50% by weight, preferably from 0.5 to 25% by weight, in particular from 1 to 20% by weight, particularly preferably from 2 to 15% by weight and very particularly preferably from 5 to 10% by weight.

Furthermore, for the action according to the present invention of the polymers it is advantageous if the side chain of the formula I has a certain length. Thus, n in the formula I is preferably a number $\geq 5$, in particular $\geq 10$ and particularly preferably $\geq 15$.

The polymers have an activity optimum when n is in the range from 20 to 60, but polymers of the formula I having shorter or longer side chains are also suitable as additives for mineral building materials. It is here generally unimportant whether the unit $-(\text{Alk-O})_n-$ is a uniformly built-up polyalkylene oxide unit or is built up of different alkylene oxide units. In this case, the alkylene oxide units can be arranged randomly or in blocks in the polyalkylene oxide unit $-(\text{Alk-O})_n-$.

Alk is preferably 1,2-propylene, 1,2-butylene and in particular 1,2-ethylene. The terminal unit R of the polyalkylene oxide side chain of the formula I is preferably hydrogen or $C_1-C_4$-alkyl, in particular methyl or ethyl. In the formula I, Y is preferably a single bond, a $C_1-C_4$-alkylene unit (Alk'), or possibly also a trivalent radical derived from glycerol.

Particular preference is given to polymers in which X is a carbonyl function or, when Alk' is a $C_1-C_4$-alkylene unit, can also be

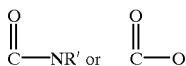

where R' is as defined above and is particularly preferably hydrogen, $C_1-C_4$-alkyl, benzyl or phenyl. Very particular preference is given to polymers in which X is a carbonyl function and Y is a single bond.

It is also advantageous if the weight average molecular weight of the polymers is in the range from 1,000 to 300,000 Dalton, preferably in the range from 5,000 to 150,000 Dalton, in particular in the range from 8,000 to 100,000 Dalton and very particularly preferably in the range from 12,000 to 70,000 Dalton.

In a preferred embodiment of the present invention, use is made of polymers which are obtainable by free-radical copolymerization of from 2 to 95% by weight, preferably from 3 to 50% by weight and in particular from 10 to 40% by weight, based on the monomers to be polymerized, of ethylenically unsaturated monomers A containing carboxyl groups and from 5 to 98% by weight, preferably from 50 to 97% by weight and in particular from 60 to 90% by weight, of ethylenically unsaturated monomers B having side chains of the formula I, and also, if desired, up to 50% by weight, preferably up to 30% by weight and in particular up to 20% by weight, of further monomers C in the presence of from 0.1 to 50% by weight, preferably from 0.5 to 25% by weight, in particular from 1 to 20% by weight, particularly preferably from 2 to 15% by weight and very particularly preferably from 5 to 10% by weight, of the abovementioned phosphorus-containing compounds (Embodiment 1).

In this embodiment, the monomers A are selected from the group consisting of ethylenically unsaturated $C_3-C_6$-monocarboxylic acids such as acrylic acid, methacrylic acid, crotonic acid, isocrotonic acid, 2-ethylpropenoic acid; ethylenically unsaturated $C_4-C_6$-dicarboxylic acids such as maleic acid, fumaric acid, itaconic acid, citraconic acid and also the salts of the monocarboxylic and dicarboxylic acids mentioned, in particular the sodium, potassium or ammonium salts; the anhydrides of the ethylenically unsaturated $C_4-C_6$-dicarboxylic acids, e.g. maleic anhydride, itaconic anhydride, citraconic anhydride; the monoesters of the ethylenically unsaturated $C_4-C_6$-dicarboxylic acids with $C_1-C_{12}$-alkanols or alcohols of the formula II

where p, Y, Alk, R and n are as defined above, e.g. monomethyl maleate, mono-n-butyl maleate, mono-n-butyl fumarate, mono(methylpolyethylene glycol)maleate; the monoamides of the ethylenically unsaturated $C_4-C_6$-dicarboxylic acids with $NH_3$, with primary $C_1-C_{12}$-alkylamines or with amines of the formula III or IIIa

where Alk, Alk', n and R are as defined above, for example (methylpolyethylene glycol)maleic monoamide.

In this embodiment of the present invention, the monomers B are preferably selected from among the esters of monoethylenically unsaturated $C_3-C_6$-monocarboxylic acids with alcohols of the formula II and the amides of monoethylenically unsaturated $C_3-C_6$-monocarboxylic acids with amines of the formula III or IIIa. Examples of suitable monomers B include: hydroxyethyl (meth)acrylate, hydroxyethyl(meth)acrylamide, hydroxypropyl (meth)acrylate, hydroxypropyl(meth)acrylamide, polyethylene glycol mono(meth)acrylate, polyethylene glycol mono (meth)acrylamide, polypropylene glycol mono(meth) acrylate, polybutylene glycol mono(meth)acrylate, polyethylene glycol-polypropylene glycol mono(meth)acrylate, polyethylene glycol-polybutylene glycol mono(meth) acrylate, polypropylene glycol-polybutylene glycol mono (meth)acrylate, polyethylene glycol-polypropylene glycol-polybutylene glycol mono(meth)acrylate, methoxypolyethylene glycol mono(meth)acrylate, methoxypolyethylene glycol mono(meth)acrylamide, methoxypolypropylene glycol mono(meth)acrylate, methoxypolybutylene glycol mono(meth)acrylate, methoxypolybutylene glycol mono(meth)acrylamide, methoxypolyethylene glycol-polypropylene glycol mono(meth)acrylate, methoxypolyethylene glycol-polybutylene glycol mono(meth)acrylate, methoxypolypropylene glycol-polybutylene glycol mono (meth)acrylate, methoxypolyethylene glycol-polypropylene glycol-polybutylene glycol mono(meth)acrylate, ethoxypolyethylene glycol mono(meth)acrylate, ethoxypolyethylene glycol mono(meth)acrylamide, ethoxypolypropylene glycol mono(meth)acrylate, ethoxypolybutylene glycol mono(meth)acrylate, ethoxypolyethylene glycol-polypropylene glycol mono(meth)acrylate, ethoxypolyethylene glycol-polybutylene glycol mono(meth)acrylate, ethoxypolypropylene glycol-polybutylene glycol mono (meth)acrylate and ethoxypolyethylene glycol-polypropylene glycol-polybutylene glycol mono(meth) acrylate.

Particularly preferred monomers B in this embodiment of the invention are the esters of acrylic acid and in particular methacrylic acid with the alcohols of the formula II. Particular preference is given to the esters of those alcohols in which Y is a single bond and n is a number ≧5, in particular ≧10 and particularly preferably ≧15. Very particular preference is given to esters of those alcohols of the formula II in which Y is a single bond and n is in the range from 20 to 60.

In this embodiment, the preferred monomers A are acrylic acid and in particular methacrylic acid and also their sodium, potassium and ammonium salts.

Particular preference is given to using polymers which are built up of methacrylic acid and methylpolyethylene glycol methacrylate. Very particular preference is given to polymers in which the methylpolyethylene glycol methacrylate has from 10 to 60, in particular from 21 to 55, ethylene oxide units. Methacrylic acid and methylpolyethylene glycol methacrylate are preferably present in a weight ratio of from 1:9 to 4:6, particularly preferably about 2:8.

Suitable monomers C include, as monomers C1, $C_1$–$C_{10}$-alkyl esters of acrylic acid and methacrylic acid, e.g. methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, n-decyl (meth)acrylate, 2-propylheptyl (meth)acrylate; the vinyl and allyl esters of $C_1$–$C_{12}$-monocarboxylic acids, e.g. vinyl or allyl formate, acetate, propionate and butyrate; vinyl and allyl ethers of $C_1$–$C_{10}$-alkanols, e.g. methyl vinyl ether, ethyl vinyl ether, n-propyl vinyl ether, isobutyl vinyl ether, 2-ethylhexyl vinyl ether and the corresponding allyl ethers; the amides of ethylenically unsaturated carboxylic acids, in particular acrylamides and methacrylamides such as acrylamide, methacrylamide, N-tert-butylacrylamide, N-methyl(meth)acrylamide.

The monomers C also include, as monomers C2, N-vinyl compounds such as vinylacetamide, N-vinylpyrrolidone, N-vinylimidazole, N-vinylcaprolactam and, as monomers C3, acrylonitrile, allyl alcohol, vinylpyridine, acrolein and methacrolein.

Furthermore, the monomers C include, as monomers C4, vinylaromatic compounds such as styrene, α-methylstyrene, vinyltoluene, vinylchlorobenzene, etc.; linear or branched $C_2$–$C_{12}$-olefins such as ethene, propene, 1-butene, 2-butene, isobutene, 2-ethylbutene, 1-pentene, 2-methylpentene, 3-methylpentene, 4-methylpentene, 1-hexene, 1-octene and also α-$C_8$–$C_{10}$-olefins; $C_4$–$C_{12}$-cycloolefins such as cyclobutene, cyclopentene, cyclohexene or cyclooctene; dienes such as butadiene, isoprene, 1,3-pentadiene, 1,3-hexadiene and 1,3-octadiene. Preferred monomers C4 are vinylaromatic compounds, in particular styrene and $C_2$–$C_{12}$-olefins, in particular $C_2$–$C_6$-olefins and particularly preferably 1-butene, isobutene and 1-pentene.

In addition, the monomers C also include monomers C5 which are ionizable in aqueous solution or have an ionic group. These include ethylenically unsaturated sulfonic acids, e.g. vinylsulfonic acid, allylsulfonic acid, methallylsulfonic acid, styrenesulfonic acid, allyloxybenzenesulfonic acid, 2-acrylamido-2-methylpropanesulfonic acid, sulfoethyl methacrylate, 2-hydroxy-3-(2-propenyloxy) propanesulfonic acid, 3-sulfopropyl acrylate, sulfoethoxypolyethylene glycol (meth)acrylate (degree of ethoxylation from 2 to 100), sulfoethoxypolypropylene glycol methacrylate and also their salts, e.g. their alkali metal or ammonium salts; ethylenically unsaturated phosphonic acids such as allylphosphonic acid, isopropenylphosphonic acid, vinylphosphonic acid and also their salts, e.g. their alkali metal or ammonium salts; and also ethylenically unsaturated amines or ethylenically unsaturated quaternized ammonium compounds such as 2-(N,N-dimethylamino)ethyl (meth)acrylate, 3-(N,N-dimethylamino)propyl (meth)acrylate, 2-(N,N,N-trimethylammonium)ethyl (meth)acrylate, 3-(N,N,N-trimethylammonium)propyl (meth)acrylate chloride, and N,N-diallyl-N,N-dimethylammonium chloride. As monomers C, preference is given to using the monomers C5, in particular the ethylenically unsaturated sulfonic acids and phosphonic acids or their salts.

Further suitable monomers C are ethylenically unsaturated siloxane compounds, for example vinylsilanes or (meth)acryloxyalkylsilanes, as are described, for example, in EP-A 327 006, EP-A 327 376 or EP-A 612 771, and also polydimethylsiloxane-bis(propylmaleic monoamide) or polydimethylsiloxane-bis(propyleneaminomaleic monoamide).

In another preferred embodiment of the present invention, the monomers B are selected from among compounds of the formula IV

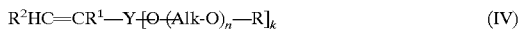

where $R^1$, $R^2$ are, independently of one another, hydrogen or $C_1$–$C_4$-alkyl and Y, Alk, R, k are as defined above and n >12 (Embodiment 2). Preferred compounds B are, in this case, the vinyl and allyl ethers of the formula V or Va

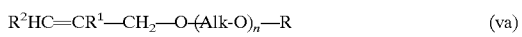

where $R^1$, $R^2$, Alk, n and R are as defined above. In particular, R is hydrogen or a $C_1$–$C_4$-alkyl group.

Examples of suitable monomers include: polyethylene glycol mono(meth)allyl ether, polypropylene glycol mono (meth)allyl ether, polyethylene glycol-polypropylene glycol mono(meth)allyl ether, polyethylene glycol-polybutylene glycol mono(meth)allyl ether, polypropylene glycol-polybutylene glycol mono(meth)allyl ether, methoxypolyethylene glycol mono(meth)allyl ether, methoxypolypropylene glycol mono(meth)allyl ether, methoxypolybutylene glycol mono(meth)allyl ether, methoxypolyethylene glycol-polypropylene glycol mono(meth)allyl ether, methoxypolyethylene glycol-polybutylene glycol mono(meth)allyl ether, methoxypolyethylene glycol-polypropylene glycol-polybutylene glycol mono(meth)allyl ether, ethoxypolyethylene glycol mono(meth)allyl ether, ethoxypolypropylene glycol mono(meth)allyl ether, ethoxypolybutylene glycol mono(meth)allyl ether, ethoxypolyethylene glycol-polypropylene glycol mono(meth)allyl ether, ethoxypolyethylene glycol-polybutylene glycol mono(meth)allyl ether, ethoxypolypropylene glycol-polybutylene glycol mono (meth)allyl ether ethoxypolyethylene glycol-polypropylene glycol-polybutylene glycol mono(meth)allyl ether, polyethylene glycol monovinyl ether, polypropylene glycol monovinyl ether, polybutylene glycol monovinyl ether, polyethylene glycol-polypropylene glycol monovinyl ether, polyethylene glycol-polybutylene glycol monovinyl ether, polypropylene glycol-polybutylene glycol monovinyl ether, polyethylene glycol-polypropylene glycol-polybutylene glycol monovinyl ether, methoxypolyethylene glycol monovinyl ether, methoxypolypropylene glycol monovinyl ether, methoxypolybutylene glycol monovinyl ether, methoxypolyethylene glycol-polypropylene glycol monovinyl ether, methoxypolyethylene glycol-polybutylene glycol monovinyl ether, methoxypolypropylene glycol-polybutylene glycol monovinyl ether, methoxypolyethylene glycol-polypropylene glycol-polybutylene glycol monovinyl ether, ethoxypolyethylene glycol monovinyl ether, ethoxypolypropylene glycol monovinyl ether, ethoxypolybutylene glycol monovinyl ether, ethoxypolyethylene glycol-polypropylene glycol monovinyl ether, ethoxypolyethylene glycol-polybutylene glycol monovinyl ether, ethoxypolypropylene glycol-polybutylene glycol monovinyl ether, ethoxypolyethylene glycol-polypropylene glycol-polybutylene glycol monovinyl ether.

In this embodiment too, the monomers B are polymerized in amounts of from 5 to 98% by weight, preferably from 50 to 97% by weight and in particular from 60 to 90% by weight. As regards the type and amount of the phosphorus-containing compounds, what has been said above applies.

As monomers A which are copolymerized in amounts of from 2 to 95% by weight, preferably from 3 to 50% by weight and in particular from 10 to 40% by weight, based on the monomers to be polymerized, it is possible to use the monomers A of Embodiment 1. Particularly preferred monomers of this embodiment include maleic acid, fumaric acid and/or maleic anhydride.

Very particularly preferred polymers of Embodiment 2 are copolymers of from 2 to 30% by weight, based on the monomers to be polymerized, of maleic acid or maleic anhydride and from 70 to 98% by weight of polyglycol allyl ethers and/or polyglycol vinyl ethers (mean degree of ethoxylation in each case from 15 to 60).

In this embodiment too, the abovementioned monomers C can be present in copolymerized form in amounts of up to 50% by weight, preferably up to 30% by weight and in particular up to 20% by weight, based on the monomers to be polymerized.

In a further preferred embodiment of the present invention, use is made of polymers which are obtainable by free-radical copolymerization of ethylenically unsaturated monomers having reactive, functional groups, if desired, together with the monomers A and/or B and, if desired further monomers C, in the presence of from 0.1 to 50% by weight, preferably from 0.5 to 25% by weight, in particular from 1 to 20% by weight, particularly preferably from 2 to 15% by weight and very particularly preferably from 5 to 10% by weight, based on the monomers to be polymerized, of the abovementioned phosphorus-containing compounds and subsequent conversion of at least part of the reactive functional groups into side chains of the formula I and/or carboxyl groups (Embodiment 3).

Preferred reactive groups include cyclic anhydride groups and oxirane groups. The monomers having reactive, functional groups are preferably selected from among ethylenically unsaturated dicarboxylic anhydrides, e.g. maleic anhydride, citraconic anhydride, 1,2,3,6-tetrahydrophthalic anhydride, vinyl and allyl glycidyl ethers and also the glycidyl ethers of the abovementioned ethylenically unsaturated $C_3$–$C_6$-monocarboxylic acids. Particular preference is given to the abovementioned anhydrides, in particular maleic anhydride.

The conversion of the initially obtainable polymers having reactive, functional groups is generally carried out by reacting the reactive, functional groups with alcohols of the formula II or amines of the formula III or IIIa in the sense of a polymer-analogous reaction. The reaction conditions required for this purpose are known in principle to those skilled in the art (for the alcoholysis of anhydrides see, for example, J. March, 3rd Edition, John Wiley & Sons, New York, 1985, p. 347 and literature cited therein; for the aminolysis of anhydrides see ibid., p. 371 and literature cited therein; for the alcoholysis of epoxides see ibid., p. 346 and literature cited therein; for the amination of epoxides see ibid., p. 368 and literature cited therein). The polymer-analogous reaction of the preferred polymerized-in anhydride units can be carried out in the manner described in DE-A 4304 109, DE-A 195 13126 or EP-A 610 699. The documents mentioned are hereby incorporated in full by reference.

Alcohols of the formula II suitable for the polymer-analogous conversion include alkylpolyalkylene glycols such as methylpolyethylene glycol having a mean degree of ethoxylation of 45; alkylpolyethylene glycol-block-polypropylene glycols such as methylpolyethylene glycol-block-polypropylene glycol having 40 ethylene oxide units and 5 propylene oxide units; alkylpolyethylene glycol-random-polypropylene glycols, such as methylpolyethylene glycol-random-polypropylene glycol having a random distribution of 30 ethylene oxide units and 10 propylene oxide units; butylpolypropylene glycol having a mean degree of propoxylation of 20.

Polyalkylene glycol amines of the formula III or IIIa suitable for the polymer-analogous conversion are, for example, methylpolyethylene glycol amine having a mean degree of ethoxylation of 8 or methylpolyethylene glycol-block-polypropylene glycol amine having a mean degree of ethoxylation of 25 and a mean degree of propoxylation of 5.

The monomers containing the reactive, functional groups are preferably used in amounts of from 2 to 95% by weight, in particular from 30 to 90% by weight and particularly preferably from 50 to 90% by weight, based on the total amount of monomers to be polymerized.

A preferred variant of Embodiment 3 is the use of polymers which are built up of the abovementioned monomers C4, hereinafter also referred to as monomers D, and the monomers E' which are derived from monoesters of ethylenically unsaturated anhydrides (monomers E). Such polymers can additionally comprise further monomers C1, C2, C3 and/or C5, as mentioned above, in copolymerized form.

Such polymers are in principle obtainable in two different ways. Thus, on the one hand, the monoesters of the ethylenically unsaturated dicarboxylic acids (monomers E') can be polymerized per se together with the monomers D in the presence of the phosphorus-containing compounds. Preference is given to polymers which are obtainable by free-radical polymerization of the abovementioned anhydrides of ethylenically unsaturated dicarboxylic acids (monomers E) together with said monomers D which are preferably selected from among vinylaromatic compounds, in particular styrene and $C_2$–$C_{12}$-olefins, in particular $C_2$–$C_6$-olefins and particularly preferably 1-butene, isobutene and 1-pentene, in the presence of from 0.1 to 50% by weight, preferably from 0.5 to 25% by weight, in particular from 1 to 20% by weight, particularly preferably from 2 to 15% by weight and very particularly preferably from 5 to 10% by weight, based on the monomers to be polymerized, of the phosphorus-containing compounds and conversion of the polymerized-in anhydride units into carboxylate groups and the side chains of the formula I according to the present invention by reaction with alcohols of the formula II.

The conversion of the anhydride units can be carried out either during the polymerization reaction or after the polymerization reaction. It is also possible to generate the monoester in situ by reacting the ethylenically unsaturated anhydride with the alcohol of the formula II in a reaction preceding the polymerization and to polymerize this reaction mixture with the monomers D in the presence of the phosphorus-containing compounds.

A particularly preferred variant of this Embodiment 3 comprises the following steps:

1. Reaction of the ethylenically unsaturated dicarboxylic anhydride (monomer E) with an alcohol of the formula II, in the presence or absence of an esterification catalyst, for example an organic sulfonic acid,
2. polymerization of this reaction mixture together with monomers D and, if desired, further monomers E and/or further alcohol of the formula II in the presence of the phosphorus-containing compounds and free-radical polymerization initiators,
3. if appropriate, completion of the polymer-analogous conversion of the anhydride units by increasing the reaction temperature and/or by adding further alcohol of the formula II.

Preferred polymers of this embodiment are those which are obtainable by polymer-analogous reaction of copolymers comprising from 55 to 80% by weight of maleic anhydride and from 20 to 45% by weight of 1-butene, isobutene or 1-pentene, or of copolymers comprising from 30 to 60% by weight of maleic anhydride and from 40 to 70% by weight of styrene with alcohols of the formula II.

Polymers which are obtainable by free-radical polymerization of the monomers D and the monomers E plus, if desired, further monomers C in the presence of from 0.1 to 50% by weight of phosphorus-containing compounds are novel and as starting polymers for the polymers of the present invention having side chains of the formula I and carboxyl groups are likewise subject matter of the present invention.

Preferred polymers of this class are obtainable by polymerization of from 5 to 98% by weight, in particular from 10 to 70% by weight and particularly preferably from 10 to 50% by weight, based on the monomers to be polymerized, of monomers D with from 2 to 95% by weight, in particular from 30 to 90% by weight and particularly preferably from 50 to 90% by weight, of monomers E and also, if desired, up to 50% by weight, preferably up to 30% by weight and particularly preferably up to 20% by weight, of monomers C1, C2, C3 and/or C5.

It has now surprisingly been found that such polymers are likewise suitable as additives for mineral building materials, particularly when the monomers D are selected from among the abovementioned olefins and/or cycloolefins. The use of such polymers is accordingly likewise subject matter of the present invention. Polymers in which monomer E is maleic anhydride are particularly suitable. It is likewise advantageous for the use properties if monomer D is selected from among 1-butene, isobutene and 1-pentene. Very particular preference is given to polymers of from 20 to 45% by weight of 1-butene, isobutene and/or 1-pentene and from 55 to 80% by weight of maleic anhydride. Such copolymers preferably have a weight average molecular weight $M_w$ in the range from 1,500 to 35,000.

All abovementioned polymer classes of Embodiments 1 to 3 can further comprise polymerized-in structural units derived from maleimide which may be substituted on the nitrogen by $C_1$–$C_{20}$-alkyl, $C_6$–$C_{20}$-aryl or $C_7$–$C_{20}$-aralkyl. Suitable maleimide units are described, for example, in DE-A 43 04 109, DE-A 195 13 126 and EP-A 610 699, which are hereby incorporated in full by reference. Such polymers are in principle obtainable in two different ways: thus, for example, the abovementioned monomers can be copolymerized by a free-radical mechanism with suitable derivatives of maleimide, with the copolymerization being carried out in the presence of phosphorus-containing compounds. Alternatively, it is possible to use polymers which are obtainable by 1. copolymerization of maleic anhydride with monomers selected, in particular, from among the monomers of group A, group B and/or group D, in the presence of phosphorus-containing compounds,
2. and subsequent polymer-analogous reaction of the copolymerized maleic anhydrides with ammonia, primary $C_1$–$C_{20}$-alkylamines, $C_6$–$C_{20}$-arylamines or $C_7$–$C_{20}$-aralkylamines.

The polymers to be employed according to the present invention are prepared, as mentioned above, by free-radical polymerization of ethylenically unsaturated monomers A containing carboxyl groups and ethylenically unsaturated monomers B having side chains of the formula I and also, if desired, further monomers C in the presence of from 0.1 to 50% by weight, preferably from 0.5 to 25% by weight, in particular from 1 to 20% by weight, particularly preferably from 2 to 15% by weight and very particularly preferably from 5 to 10% by weight, based on the monomers to be polymerized, of phosphorus-containing compounds (method 1) or by free-radical copolymerization of ethylenically unsaturated monomers having reactive, functional groups, if desired together with monomers A and/or B and, if desired, further monomers C in the presence of from 0.1 to 50% by weight, preferably from 0.5 to 25% by weight, in particular from 1 to 20% by weight, particularly preferably from 2 to 15% by weight and very particularly preferably from 5 to 10% by weight, based on the monomers to be polymerized, of phosphorus-containing compounds and subsequent conversion of at least part of the reactive, functional groups into side chains of the formula I and/or carboxyl groups (method 2).

The phosphorus-containing compound can either be initially charged in the reaction vessel or can be fed continuously or a little at a time into the reaction mixture. Preferably, the major part and in particular at least 90% of the phosphorus-containing compound is added during the polymerization reaction.

The monomers to be polymerized can either be initially charged in the reaction vessel or be fed into the reaction mixture a little at a time or preferably continuously. Preferably, the major part and in particular at least 90% by weight of the monomers to be polymerized are added continuously to the reaction mixture.

The polymerization can be carried out as a bulk polymerization, solution polymerization or, if the monomers are sparingly soluble, as an emulsion, dispersion or suspension polymerization. It is likewise possible, if the polymer is sufficiently sparingly soluble in the reaction mixture, to carry out the polymerization as a precipitation polymerization.

If the polymers are prepared by method 1, the polymerization is preferably carried out as a solution or precipitation polymerization in water or in a mixture of water and up to 60% by weight, based on the mixture, of an OH-containing solvent which is selected from among $C_1$–$C_4$-alkanols, $C_2$–$C_{10}$-alkylene glycols, in which the alkylene chain may be interrupted by one or more non-adjacent oxygen atoms and monoethers of the $C_2$–$C_{10}$-alkylene glycols with $C_1$–$C_4$-alkanols. Examples of suitable OH-containing solvents are methanol, ethanol, isopropanol, n-butanol, ethylene glycol, diethylene glycol, methyl diglycol, dipropylene glycol, butyl glycol, butyl diglycol, triethylene glycol, the methylethers of said glycols and also oligomers of ethylene oxide containing from 4 to 6 ethylene oxide units, oligomers of propylene oxide containing from 3 to 6 propylene oxide units and also polyethylene glycol-polypropylene glycol cooligomers. Furthermore, the aqueous reaction medium can further comprise other water-miscible solvents such as acetone, methyl ethyl ketone, tetrahydrofuran, dioxane, N-methylpyrrolidone, dimethylformamide, etc.

If the polymers are prepared by method 2, the polymerization is preferably carried out as a solution or precipitation polymerization in an inert solvent. Suitable solvents include cyclic ethers such as tetrahydrofuran or dioxane, ketones such as acetone, methyl ethyl ketone, cyclohexanone, esters of aliphatic carboxylic acids with $C_1$–$C_4$-alkanols, e.g. ethyl acetate or n-butyl acetate, aromatic hydrocarbons such as toluene, xylenes, cumene, chlorobenzene, ethylbenzene, industrial mixtures of alkylaromatics, cyclohexane and industrial mixtures of aliphatics.

The polymerization can also be carried out as an emulsion or suspension polymerization if the monomers are sparingly soluble in the reaction medium. Such polymerization methods are known to those skilled in the art and can be carried out in the customary manner for the preparation of the polymers of the present invention. If the preparation of the polymers of the present invention is carried out by free-radical, aqueous emulsion polymerization, it is advisable to add surfactants or protective colloids to the reaction medium. A listing of suitable emulsifiers and protective colloids may be found, for example, in Houben Weyl, Methoden der organischen Chemie, Volume XIV/1 Makromolekulare Stoffe, Georg Thieme Verlag, Stuttgart 1961, p. 411 ff.

The polymerization initiators used for the free-radical polymerization are preferably soluble in the reaction medium. They are used in amounts of up to 30% by weight, preferably from 0.05 to 15% by weight, particularly preferably from 0.2 to 8% by weight, based on the monomers used in the polymerization.

If the polymerization is carried out in a water-containing solvent, preference is given to using water-soluble polymerization initiators such as sodium persulfate, potassium persulfate, ammonium persulfate, hydrogen peroxide, tert-butyl hydroperoxide, 2,2'-azobis(2-amidinopropane) dihydrochloride, 2,2'-azobis(N,N'-dimethyleneisobutyramidine) dihydrochloride and 2,2'-azobis(4-cyanopentanoic acid) The initiators are used either alone or in admixture, e.g. mixtures of hydrogen peroxide and sodium persulfate.

The known redox initiator systems can also be used as polymerization initiators. Such redox initiator systems comprise at least one peroxide-containing compound in combination with a redox coinitiator, for example sulfur compounds having a reducing action, e.g. bisulfites, sulfites, thiosulfates, dithionites and tetrathionates of alkali metals and ammonium compounds, sodium hydroxymethanesulfinate dihydrate and thiourea. Thus, it is possible to use combinations of peroxodisulfates with alkali metal or ammonium hydrogen sulfites, e.g. ammonium peroxodisulfate and ammonium disulfite. The weight ratio of peroxide-containing compounds to the redox coinitiators is preferably from 30:1 to 0.05:1.

In combination with the initiators or the redox initiator systems, it is possible to additionally use transition metal catalysts such as iron, nickel, cobalt, manganese, copper, vanadium or chromium salts, e.g. iron(II) sulfate, cobalt(II) chloride, nickel(II) sulfate, copper(I) chloride, manganese (II) acetate, vanadium(III) acetate, manganese(II) chloride. Based on the monomers, these transition metal salts are usually used in amounts of from 0.1 ppm to 1000 ppm. Thus, it is possible to use combinations of hydrogen peroxide with iron(II) salts, e.g. from 0.5 to30% of hydrogen peroxide and from 0.1 to 500 ppm of Mohr's salt.

For the polymerization in a nonaqueous medium, preference is given to using initiators such as dibenzoyl peroxide, dicyclohexyl peroxydicarbonate, dilauryl peroxide, methyl ethyl ketone peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, azobisisobutyronitrile, 2,2'-azobis(N,N'-dimethyleneisobutyramidine) dihydrochloride, 4,4'-azobis (4-cyanovaleric acid). In combination with these initiators, it is possible to use reducing agents such as benzoin, dimethylaniline, ascorbic acid and, if desired, complexes and salts of transition metals which are soluble in the reaction medium.

If the reaction mixture is partially polymerized at the lower limit of the temperature range which is suitable for the polymerization and is subsequently fully polymerized at a higher temperature, it is advantageous to use at least two different initiators which decompose at different temperatures so that a sufficient concentration of free radicals is available in each temperature range.

The polymerization reaction is preferably carried out at from 30 to 300° C., preferably from 50 to 160° C. and very particularly preferably from 80 to 150° C. Preference is given to carry out the reaction with exclusion of oxygen, preferably in a stream of nitrogen. The polymerization is generally carried out at atmospheric pressure, but it is possible to employ lower or higher pressures, particularly when the polymerization temperatures employed are above the boiling point of the monomers and/or the solvent.

The polymer-analogous conversion of the reactive groups into side chains of the formula I and/or carboxyl groups which follows the polymerization in the case of method 2 is carried out in a manner known per se using a method similar to that described for Embodiment 3.

To set the desired molecular weight of the polymers, it may be necessary to carry out the polymerization in the presence of a molecular weight regulator, ie. a customary chain-terminating substance. Suitable molecular weight regulators include, for example, formaldehyde, acetaldehyde, propionaldehyde, n-butyraldehyde, isobutyraldehyde, formic acid, ammonium formate, hydroxylamine and its sulfate, chloride or phosphate; SH-containing compounds such as thioglycolic acid, mercaptopropionic acid, mercaptoethanol, mercaptopropanol, mercaptobutanols, mercaptohexanol, thiomaleic acid, thiophenol, 4-tert-butylthiophenol, n-dodecylmercaptan, tert-dodecylmercaptan. Further examples of polymerization regulators are allyl alcohol, butenol, isopropanol, n-butanol, isobutanol, glycol, glycerol, pentaerythritol.

If the use of polymerization regulators is required, they are employed in amounts of up to 20% by weight, based on the monomers. Polymerization is preferably carried out in the presence of from 0.5 to 15% by weight of an SH-containing polymerization regulator, based on the monomers.

Furthermore, it may be useful for the desired application to employ crosslinked polymers. Crosslinked polymers are obtainable either by copolymerization of the monomers mentioned with ethylenically diunsaturated or polyunsaturated compounds or by subsequent crosslinking of the carboxyl, anhydride or hydroxyl groups in the polymer using appropriate polyfunctional compounds. If crosslinking is carried out by the copolymerization route using ethylenically polyunsaturated compounds, these are usually used in proportions of from 0.01 to 20% by weight and preferably in amounts of from 0.1 to 5% by weight, based on the monomers to be polymerized. In the case of subsequent crosslinking of the functional groups in the polymer using polyfunctional reactive compounds, the latter are usually employed in amounts of from 0.2 to 20% by weight and in particular from 0.5 to 10% by weight, based on the polymer.

Suitable ethylenically diunsaturated or polyunsaturated compounds include: diacrylates or dimethacrylates of at least dihydric saturated alcohols, e.g. ethylene glycol diacrylate, ethylene glycol dimethylacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate, 3-methylpentanediol dimethacrylate; acrylic and methacrylic esters of alcohols having more than 2 OH groups, e.g. trimethylolpropane triacrylate, trimethylolpropane trimethacrylate, glyceryl tri (meth)acrylate; diacrylates or dimethacrylates of polyethylene glycols or polypropylene glycols having molecular weights of, in each case, from 200 to 9000, e.g. diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol (meth)acrylate, dipropylene glycol diacrylate, tripropylene glycol diacrylate, polypropylene glycol (meth)acrylate; vinyl esters of ethylenically unsaturated $C_3$–$C_6$-carboxylic acids, e.g. vinyl acrylate, vinyl methacrylate, vinyl itaconate; vinyl esters of saturated carboxylic acids containing at least two carboxyl groups and also divinyl and polyvinyl ethers of at least dihydric alcohols, e.g. divinyl adipate, butanediol divinyl ether, trimethylolpropane trivinyl ether; allyl esters of ethylenically unsaturated carboxylic acids, e.g. allyl acrylate, allyl methacrylate; allyl ethers of polyhydric alcohols, e.g. pentaerithritol triallyl ether; triallylsucrose, pentaallylsucrose; methylenebis(meth)acrylamide, divinylethyleneurea, divinylpropyleneurea, divinylbenzene, divinyldioxane, triallyl cyanurate, tetraallylsilane and tetravinylsilane; bis- or polyacryloylsiloxanes, diallyl phthalate, allyl vinyl ether, diallyl fumarate.

Suitable polyfunctional, reactive compounds which can be used for subsequent crosslinking are, in particular, glycidyl ethers of polyhydroxy compounds or the glycidyl esters of dicarboxylic or polycarboxylic acids. Examples of suitable crosslinking compounds include: ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, polypropylene glycol diglycidyl ether, resorcinol diglycidyl ether, diglycidyl o-phthalate, diglycidyl adipate.

Furthermore, it can be advantageous for the use properties of the polymers if some of the carboxyl groups present in the polymer or reactive functional groups which may be present are subsequently further modified by a polymer-analogous reaction. Such modifications are known in principle to those skilled in the art. In the case of conversion of the above-mentioned reactive groups, the modification can be carried out by the methods described for Embodiment 3.

The polymer-analogous reaction is preferably carried out using hydroxyl- or amino-containing compounds such as saturated or unsaturated aliphatic alcohols, e.g. methanol, ethanol, n-propanol, isopropanol, n-butanol, isobutanol, n-pentanol, n-hexanol, n-octanol, 2-ethylhexanol, nonanol, decanol, tridecanol, cyclohexanol, tallow fatty alcohol, stearyl alcohol and also $C_9$–$C_{11}$-oxoalcohols and $C_{13}$–$C_{15}$-oxoalcohols; or primary or secondary amines such as methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, taurine, dimethylamine, diethylamine, di-n-propylamine, diisopropylamine, di-n-butylamine, diisobutylamine, dihexylamine, dicyclohexylamine, di-methylcyclohexylamine, di-2-ethylhexylamine, di-n-octylamine, di-isotridecylamine, di-tallow fatty amine, distearylamine, dioleylamine, ethanolamine, diethanolamine, n-propanolamine, di-n-propanolamine, morpholine and bis(polydimethylsiloxane-1-prop-3-yl) amine.

The polymers of the present invention containing carboxyl groups and side chains of the formula I are very useful as additives for cement mixtures such as concrete or mortar. For the purposes of the present invention, cement is, for example, Portland cement, alumina cement or mixed cement such as pozzolanic cement, slag cement or other types. Portland cement is preferred. The copolymers are used in an amount of from 0.01 to 10% by weight, preferably from 0.05 to 3% by weight, based on the weight of the cement.

The polymers can be added in solid form, which is obtainable by drying, for example by spray-drying, of polymer solutions or dispersions as are formed in the polymerization, to the ready-to-use preparation of the mineral building material. It is also conceivable for the copolymers to be formulated with the mineral binder and for the ready-to-use preparation of the mineral building material to be prepared therefrom. Preference is given to using the copolymer in liquid form, ie. dissolved, emulsified or suspended form, for example in the form of the polymer solution, in the preparation of the mineral building material.

For use in concrete or mortar, it can be advantageous to use polymers which go over into a water-soluble and thus active form only in the presence of the alkaline concrete or mortar, for example polymers containing carboxylic acid or carboxylic anhydride structures. The slow release of the active polymer results in an activity which lasts for a longer time.

The polymers of the present invention can also be used in combination with the known concrete fluidizers based on naphthalene-formaldehyde condensate sulfonate, melamine-formaldehyde condensate sulfonate, phenolsulfonic acid-formaldehyde condensate and ligninsulfonates. They can also be used in combination with high molecular weight polyethyleneoxides ($M_w$ 100,000–8,000,000). Furthermore, they can be used together with celluloses such as alkylcelluloses or hydroxyalkylcelluloses, starches or starch derivatives. Moreover, additives such as air pore formers, expanders, waterproofing agents, setting retarders, setting accelerators, frost protection agents, sealants, pigments, corrosion inhibitors, flow improvers, injection aids, stabilizers and hollow microspheres can be mixed in.

In principle, the polymers of the present invention can also be used together with film-forming polymers. These are polymers having a glass transition temperature (DSC midpoint temperature, ASTM D 3481-82) of <65° C., preferably <50° C., particularly preferably <25° C. and very particularly preferably <0° C. A person skilled in the art is able to select suitable polymers with the aid of the relationship between the glass transition temperature of homopolymers and the glass transition temperature of copolymers formulated by Fox (T. G. Fox, Bull. Am. Phys. Soc. (Ser.II) 1, 1956, 123). (Glass transition temperatures for homopolymers may be found, for example, in Ullmanns Encyclopedia of Industrial Chemistry, Vol. A21, VCH, Weinheim 1992, p. 169 or in J. Brandrup, E. H. Immergut, Polymer Handbook 3rd Ed., J. Wiley, New York 1998).

Furthermore, it is often advantageous to use the polymers of the present invention together with antifoams. This prevents, when preparing the ready-to-use mineral building materials, too much air being introduced into the concrete in the form of air pores which would reduce the strength of the set mineral building material. Suitable antifoams include, in particular, antifoams based on polyalkylene oxide, for example dialkyl ethers of polyethylene oxide and polypropylene oxide, e.g. diethylene glycol, heptyl ether, polyethylene oxide oleyl ether, polypropylene oxide dibutyl ether, 2-ethylhexyl ethers of polyethylene oxide and polypropylene oxide. Likewise suitable are the ethoxylation and propoxylation products of alcohols having from 10 to 20 carbon atoms, ethbxylated/propoxylated (alkyl)phenol such as propoxylated phenol (degree of propoxylation from 2 to 40), ethoxylated (alkyl)phenol (degree of ethoxylation from 2 to 50). Likewise suitable are the diesters of alkylene glycols or polyalkylene glycols, for example diethylene glycol dioleate and ethylene glycol distearate, or aliphatic esters of alkylene oxide sorbitans, for example polyethylene oxide sorbitan monolaurate and polyethylene oxide sorbitan trioleate. Other suitable antifoams are phosphoric esters such as tributyl phosphate or triisobutyl phosphate, phthalates such as dibutyl phthalate, siloxanes such as polydimethylsiloxane and their derivatives as are obtained, for example, by hydrosilylation using allyl alkoxylates. Also suitable are anionic antifoams such as the sulfuric monoesters of ethoxylated (alkyl)phenols, e.g. methylpolypropylene oxide sulfate sodium salt and n-dodecylphenol ethoxylate sulfate sodium salt, or phosphates of ethoxylated fatty alcohols such as polyethylene oxide stearyl phosphate. Such antifoams are usually used in amounts of from 0.05 to 10% by weight and preferably from 0.5 to 5% by weight, based on the polymers.

The antifoams can be combined with the polymer in various ways. For example, if the polymer is in the form of an aqueous solution, the antifoam can be added as solid or in dissolved form to the polymer solution. If the antifoam is not soluble in the aqueous polymer solution, emulsifiers or protective colloids can be added to stabilize it.

If the polymer of the present invention is in the form of a solid as is obtained, for example, by spray drying or fluidized-bed spray granulation, the antifoam can be mixed in as solid or else processed together with the polymer in the spray drying or spray granulation process.

EXAMPLES

I. Analytical Methods

Ia. Determination of the Mean Molecular Weight

The weight average molecular weight was determined by gel permeation chromatography (GPC) using aqueous eluents. Calibration was carried out using a narrow-distribution sodium polyacrylate standard. Eluents used were an aqueous solution of potassium dihydrogen phosphate and sodium chloride. Ethylene glycol was used as internal standard. The chromatography columns were loaded with TSK PW-XL 3000 and TSK PW-XL 5000 (from TosoHaas) as stationary phase. A differential refractometer was used as detector.

Ib. Determination of the K Value

The K values of the aqueous sodium salt solutions of the copolymers were determined by the method of H. Fikentscher, Cellulose-Chemie, Volume 13 (1932), 58–64 and 71–74, in aqueous solution at a pH of 7, a temperature of 25° C. and a polymer concentration of the sodium salt of the copolymer of 1% by weight.

Ic. Determination of the Solids Content

A defined amount of the sample (about 0.5–1 g) is weighed into an aluminum dish (initial weight). The sample is dried for 30 minutes under an IR lamp (160 volt). The mass of the sample is then determined again (final weight). The percentage solids content SC is calculated as follows: SC=final weight×100/initial weight [% by weight]

II. Methods of Preparation for Copolymers 1 to 10

Copolymer 1 (According to the Present Invention)

A 2 l glass reactor fitted with anchor stirrer, 5 automatic feed metering facilities, reflux condenser and oil bath heating was charged with 522.85 g of deionized water and the water was heated to boiling under inert gas. Feed stream 1 consisting of 192 g of methylpolyethylene glycol methacrylate (having a mean degree of ethoxylation of 22) and 360 g of deionized water, feed stream 2 consisting of 48 g of methacrylic acid, feed stream 3 consisting of 60 g of a 20% strength solution of sodium phosphinate monohydrate in deionized water and feed stream 4 consisting of 70.3 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled to 30° C. and neutralized using 37 g of a 50% strength solution of sodium hydroxide in deionized water. This gave a clear solution of the polymer having a pH of 7.0 and a solids content of 20.4% by weight. The K value is 31.9, the weight average molecular weight is 20,300.

Copolymer 2 (Comparative Example)

A 4 l glass reactor fitted with anchor stirrer, 4 automatic feed metering facilities, reflux condenser and oil bath heating was charged with 1199 g of deionized water and the water was heated to boiling under inert gas. Feed stream 1 consisting of 403.2 g of methylpolyethylene glycol methacrylate (having a mean degree of ethoxylation of 22) and 750 g of deionized water, feed stream 2 consisting of 100.8 g of methacrylic acid and feed stream 3 consisting of 147.6 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled to 30° C. and neutralized using 78 g of a 50% strength solution of sodium hydroxide in deionized water. This gave a clear solution of the polymer having a pH of 7.0 and a solids content of 19.8% by weight. The weight average molecular weight was 40,000, the K value was 42.2.

Copolymer 3 (According to the Present Invention)

A 2 l glass reactor fitted with anchor stirrer, 5 automatic feed metering facilities, reflux condenser and oil bath heating was charged with 523 g of deionized water and the water was heated to boiling under inert gas. Feed stream 1 consisting of 192 g of methylpolyethylene glycol methacrylate (having a mean degree of ethoxylation of 22 ) and 360 g of deionized water, feed stream 2 consisting of 48 g of methacrylic acid, feed stream 3 consisting of 54 g of an 11.1% strength solution of sodium phosphinate monohydrate in deionized water and feed stream 4 consisting of 70.3 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled to 30° C. and neutralized using 44.3 g of a 50% strength solution of sodium hydroxide in deionized water. This gave a yellow-brown, slightly turbid solution of the polymer having a pH of 7.0 and a solids content of 20.2% by weight. The K value is 33.9, the weight average molecular weight is 25,100.

Copolymer 4 (According to the Present Invention)

A 2 l glass reactor fitted with anchor stirrer, 5 automatic feed metering facilities, reflux condenser and oil bath heating was charged with 523 g of deionized water and the water was heated to boiling under inert gas. Feed stream 1 consisting of 192 g of methylpolyethylene glycol methacrylate (having a mean degree of ethoxylation of 22) and 360 g of deionized water, feed stream 2 consisting of 48 g of methacrylic acid, feed stream 3 consisting of 72 g of a 33.3% strength solution of sodium phosphinate monohydrate in deionized water and feed stream 4 consisting of 70.3 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled to 30° C. and neutralized using 41.60 g of a 50% strength solution of sodium hydroxide in deionized water. This gave a yellow-brown solution of the polymer having a pH of 7.0 and a solids content of 20.8% by weight. The K value is 25.6, the weight average molecular weight is 13,500.

Copolymer 5 (According to the Present Invention)

A 2 l glass reactor fitted with anchor stirrer, 5 automatic feed metering facilities, reflux condenser and oil bath heating was charged with 523 g of deionized water and the water was heated to boiling under inert gas. Feed stream 1 consisting of 192 g of methylpolyethylene glycol methacrylate (having a mean degree of ethoxylation of 22) and 360 g of deionized water, feed stream 2 consisting of 48 g of methacrylic acid, feed stream 3 consisting of 72 g of a 33.3% strength solution of sodium phosphinate monohydrate in deionized water and feed stream 4 consisting of 70.3 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. 3.7 g of diglycidyl orthophthalate were then added to the mixture and the mixture was heated at the boiling point for 3 hours while stirring. The mixture was subsequently cooled to 30° C. and neutralized using 42.2 g of a 50% strength solution of sodium hydroxide in deionized water. This gave a yellow-brown solution of the polymer having a pH of 7.0 and a solids content of 21.3% by weight. The K value is 25.5, the weight average molecular weight is 13,100.

Copolymer 6 (According to the Present Invention)

A 2 l glass reactor fitted with anchor stirrer, 5 automatic feed metering facilities, reflux condenser and oil bath heating was charged with 523 g of deionized water and the water was heated to boiling under inert gas. Feed stream 1 consisting of 192 g of methylpolyethylene glycol methacrylate (having a mean degree of ethoxylation of 22) and 360 g of deionized water, feed stream 2 consisting of 48 g of methacrylic acid, feed stream 3 consisting of 60 g of a 50% strength by weight solution of phosphonic acid in deionized water and feed stream 4 consisting of 70.3 g of a 2.5% strength solution of sodium peroxodisulfate in deionized water were, commencing simultaneously, metered uniformly into the reactor over a period of 4 hours. The reaction mixture was subsequently allowed to polymerize further for 1 hour at the boiling point. This gave a red-brown, clear solution of the polymer having a pH of 7.0 and a solids content of 21.3% by weight. The K value is 40.0, the weight average molecular weight is 36,400.

Copolymer 7 (Comparative Example)

To prepare feed stream 1, 52.26 g of maleic anhydride were melted under nitrogen in a heatable flask and 120.00 g of polyethylene glycol having a mean degree of ethoxylation of 12 were added thereto. While stirring further, the following were subsequently added thereto: 0.02 g of hydroquinone monomethyl ether, 1.33 g of dodecyl mercaptan and 2.34 g of azobisisobutyronitrile. 120.00 g of polyethylene glycol (having a mean degree of ethoxylation of 12) and 2.6 g of maleic anhydride were placed in a 2 l glass reactor fitted with anchor stirrer, 5 automatic feed metering facilities, reflux condenser and oil bath heating. The reactor was heated under a nitrogen atmosphere to an internal temperature of 100° C. Feed stream 1 (see above) and feed stream 2 consisting of 53.32 g of styrene were, commencing simultaneously, metered into the reactor over a period of 1 hour. The mixture was subsequently stirred further for 1 hour at 100° C., 0.24 g of azobisisobutyronitrile was added and stirring was continued for another 1 hour at 100° C. The internal temperature was then increased to 140° C. and 25.66 g of a propylene oxide-ethylene oxide block copolymer containing 30 propylene oxide units and 4 ethylene oxide units were added over a period of 5 minutes. The mixture was held at 140° C. for two more hours while stirring. It was then cooled to 65° C. and 470 g of deionized water were added. The mixture was subsequently cooled to 25° C., 470.00 g of deionized water were added and the mixture was neutralized using 34.2 g of 50% strength sodium hydroxide solution. This gave a brown, very turbid solution of the polymer having a pH of 7.0 and a solids content of 41.5% by weight. The K value is 20.2, the weight average molecular weight is 18,600.

Copolymer 8 (According to the Present Invention)

To prepare feed stream 1, 52.3 g of maleic anhydride were melted under nitrogen in a heatable flask. 120 g of polyethylene glycol having a mean degree of ethoxylation of 12 were added thereto. While stirring further, the following were subsequently added: 0.02 g of hydroquinone monomethyl ether, 1.33 g of dodecyl mercaptan, 2.34 g of azobisisobutyronitrile and 17.4 g of phosphorous acid (98% by weight). 120 g of polyethylene glycol having a mean degree of ethoxylation of 12 and 2.6 g of maleic anhydride were placed in a 2 l glass reactor fitted with anchor stirrer, 5 automatic feed metering facilities, reflux condenser and oil bath heating. The reactor was heated under a nitrogen atmosphere to an internal temperature of 100° C. Feed stream 1 (see above) and feed stream 2 consisting of 53.3 g of styrene were, commencing simultaneously, metered into the reactor over a period of 1 hour. The mixture was subsequently stirred further for another 1 hour at 100° C., 0.24 g of azobisisobutyronitrile was added and stirring was continued for a further 1 hour at 100° C. The internal temperature was then increased to 140° C. and 25.66 g of a propylene oxide-ethylene oxide block copolymer containing 30 propylene oxide units and 4 ethylene oxide units were added over a period of 5 minutes. The mixture was held at 140° C. for two more hours while stirring. It was then cooled to 65° C. and 470 g of deionized water were added. The mixture was subsequently cooled to 25° C., 470 g of deionized water were added and the mixture was neutralized using 34.2 g of 50% strength sodium hydroxide solution. This gave a yellow-brown, slightly turbid solution of the polymer having a pH of 7.0 and a solids content of 41.4% by weight. The K value is 23.4, the weight average molecular weight is 21,000.

Copolymer 9 (According to the Present Invention)

A 2 l glass reactor fitted with anchor stirrer, 5 automatic feed metering facilities, reflux condenser and oil bath heating was charged with 451 g of deionized water and the water was heated to boiling under inert gas. Feed stream 1 consisting of 172.8 g of methylpolyethylene glycol methacrylate (having a mean degree of ethoxylation of 22) and 360 g of deionized water, feed stream 2 consisting of 43.2 g of methacrylic acid, feed stream 3 consisting of 24 g of 2-acrylamido-2-methylproganesulfonic acid and 72 g of deionized water, feed stream 4 consisting of 60.00 g of a 20% strength solution of sodium phosphinate monohydrate in deionized water and feed stream 5 consisting of 70.3 g of a 5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled 30° C. and neutralized using 49.5 g of a 50% strength solution of sodium hydroxide in deionized water. This gave a yellow-brown, slightly turbid solution of the polymer having a pH of 7.0 and a solids content of 20.7% by weight. The K value is 36.4, the weight average molecular weight is 29,100.

Copolymer 10 (According to the Present Invention)

A 2 l glass reactor fitted with anchor stirrer, 5 automatic feed metering facilities, reflux condenser and oil bath heating was charged with 526 g of deionized water and the water was heated to boiling under inert gas. Feed stream 1 consisting of 120 g of methylpolyethylene glycol methacrylate (having a mean degree of ethoxylation of 45) and 360 g of deionized water, feed stream 2 consisting of 120 g of methacrylic acid, feed stream 3 consisting of 60 g a 20% strength solution of sodium phosphinate monohydrate in deionized water and feed stream 4 consisting of 69.4 g of a 5% strength solution of sodium peroxodisulfate in deionized water were, commencing simultaneously, metered uniformly into the reactor over a period of 4 hours. The reaction mixture was subsequently allowed to polymerize further for 1 hour at the boiling point. The mixture was then cooled 30° C. and neutralized using 105.50 g of a 50% strength solution of sodium hydroxide in deionized water. This gave a brown, clear solution of the polymer having a pH of 7.0 and a solids content of 21.4% by weight. The K value is 42.8, the weight average molecular weight is 43,200.

Copolymer 11 (Comparative Example)

According to copolymer 1 a copolymer was prepared by polymerizing 192 g of methylpolyethylene glycol methacrylate (having a mean degree of ethoxylation of 22) and 48 g of methacrylic acid. Differing from the preparation of copolymer 1 feed stream 1 contained a solution of 1.8 g mercaptoethanol in 8 g deionized water.

A clear polymer solution was obtained having a pH of 7.0, a solids content of 20.2% by weight. The K-value is 31.3, the weight average molecular weight is 19,900.

Use Tests

Test method for concrete fluidizers based on DIN 1048 Part 1 (testing of the fluidizing action of additives for concrete)
Apparatus
Multiflow stirrer, type SE/GB (electric motor)
Stirred vessel (h=20.7 cm ; d=40.6 cm)
Table for testing slump (700 mm×700 mm with movable upper plate, see DIN 1048 Part 1, 3.2.1.1)
Truncated cone mold (internal diameter at top: 130 mm; internal diameter at bottom: 200 mm; see DIN 1048 Part 1, 3.2.1.1)
Apparatus for measuring air pore content (see DIN 1048 Part 1 3.5.1); sample container (h=8.3 cm ; d=12.3 cm) with pressure measuring apparatus which can be screwed on top
Shaking table (electric)
Stopwatch
Wooden rod (d=1.5 cm; l=55 cm)
Hand scoop (capacity about 0.6 l)
Plastic cube mold (internal edge length (L*W*H=15 cm*15 cm*15 cm; open at one side)
Materials Used
Mix: Mixing ratio cement/aggregate 1:5.56, grading curve B 16

| Quartz sand | F34 | 825 g |
| Quartz sand | 0.15–0.6 mm | 1665 g |
| Quartz sand | 0.5–1.25 mm | 2715 g |
| Quartz sand | 1.5–3.0 mm | 1485 g |
| Gravel | 3–8 mm | 3765 g |
| Gravel | 8–16 mm | 3330 g |
| Heidelberger cement CEM I 32.5R | | 2475 g |
| Tap water | | 1081 g |

Fluidizer in accordance with Table 1 (% of fluidizer, based on solid polymer per amount of cement used; "solid-solid")
Notes The amount of water added with the fluidizer has to be subtracted from the proportion of tap water. The water/cement ratio is 0.44. The quality of the cement used is checked by sifting.

Test Procedure
a. Preparation of the Concrete

All the aggregates and the cement are weighed into the stirred vessel and mixed dry for 1 minute using the Multiflow stirrer. Two thirds of the calculated amount of water is then added over a period of 30 seconds while stirring. Over the next 30 seconds, the remaining third of water admixed with fluidizer is added to the mixture. The concrete is then stirred further for another 3 minutes. The preparation of the concrete mixture is complete after a total of 5 minutes. After preparation of the concrete, the first value for determining the slump is measured.

b. Slump Test

After stirring the finished concrete composition for 5 minutes, the first measurement of the slump is made. (See DIN 1048 Part 1, 3.2.1.2 Procedure for testing slump). After determining the slump, the concrete from the table for testing slump is returned to the stirred vessel. After a total of 29 minutes 45 seconds, the concrete is again mixed for 15 seconds. The second measurement is carried out after exactly 30 minutes. This procedure is repeated after total times of 60, 90 and 120 minutes or until the measured value of the spread in the slump test has been reduced to a diameter of less than 30 cm.

c. Air Pore Content

The air content of fresh concrete is measured by the pressure equilibration method using a calibrated test apparatus having a capacity of 1 l. The air pore content is determined after the first and last measurement of the slump. For this purpose, the 1 l container of the apparatus for measuring the air pore content is filled with concrete while the concrete is being compacted for 60 seconds on a shaking table. The container has to be full to the brim with concrete after the shaking procedure. (For procedure, see DIN 1048 Part 1, 3.5 Air content). The measurement of the air pore content is then carried out.

d. Compressive Strength Test

Owing to the influence of the concrete fluidizers to be tested on the setting capability of the concrete, a compressive strength test is carried out when required. The compressive strength is determined on test specimens having an edge length of 15 cm*15 cm*15 cm. At least two cubes are produced from the concrete mixture. The test specimens are produced by half-filling the cubes with concrete, compacting the concrete for 20 seconds on the shaking table and then adding sufficient concrete to the cube mold for the concrete surface to be higher than the brim of the actual mold after further compaction for 20 seconds. Finally, the surface of the test specimens is leveled so that the surface is flush with the height of the cube molds. The test specimens for the compressive strength test are stored in a closed room at about 23° C. They are first set down in their molds and covered to protect them from moisture loss. After about 18 hours, the cubes are removed from the molds and after 24 hours from the time at which the concrete mixture was prepared a cube is tested by means of a press. The force value reached in KN is reported in N/mm² and indicates the strength of the concrete after 24 hours. After storage of the second concrete cube for 28 days from the time of preparation of the concrete, the same test procedure is repeated on the remaining test specimen and the compressive strength after 28 days is determined.

Notes

Before each new series of tests, a test without addition of fluidizer (blank value) is to be carried out. Care must also be taken to ensure that the ambient temperature is constant (23–25° C.).

TABLE 1

Results

| Fluidizer | Amount [%]¹⁾ | Antifoam²⁾ [%]³⁾ | Spread in slump test in cm | | | | | AP⁴⁾ [%] | Early strength⁵⁾ [N/mm²] |
|---|---|---|---|---|---|---|---|---|---|
| | | | 3 min | 30 min | 60 min | 90 min | 120 min | | |
| None | — | — | 20 | x⁶ | x | x | x | 2.5 | 29 |
| Ligninsulfonate | 0.75 | — | 30 | 20 | x | x | x | 3.0 | 30 |
| Naphthalenesulfonate | 0.75 | — | 37 | 31 | 28 | x | x | 2.8 | 30 |
| Melamine condensate | 1.0 | — | 35 | 27 | x | x | x | 2.4 | 30 |
| Copolymer 1 | 0.24 | 1 | 55 | 40 | 34 | 31 | 29 | 2.6 | 32 |
| Copolymer 2 (C) | 0.24 | 1 | 47.5 | 30 | x | x | x | 2.9 | 31 |
| Copolymer 3 | 0.30 | — | 51 | 41 | 38 | 37 | x | 4.5 | 30 |
| Copolymer 3 | 0.24 | 1 | 55 | 40 | 34 | 31 | 29 | 2.6 | 32 |
| Copolymer 5 | 0.20 | — | 40 | 36 | 33 | 34 | x | 4.5 | 29 |
| Copolymer 7 (C) | 0.24 | — | 26 | x | x | x | x | 2.5 | 30 |
| Copolymer 11 (C) | 0.24 | 1 | 49 | 34 | 30 | x | x | 3.1 | 29 |

¹⁾Based on cement (solid-solid)
²⁾Tributyl phosphate
³⁾Based on solid concrete fluidizer
⁴⁾Air pore content
⁵⁾After 24 hours
⁶Spreading no longer observed
C = Comparative example The results show that mineral building material preparations containing the copolymers of the present invention, even at a water/cement ratio of 0.44, have a significantly longer time window in which they are capable of flow than mineral building material preparations containing the fluidizers of the prior art without a loss of strength having to be accepted.

We claim:

1. A mineral building material, comprising:
   as an additive at least one water-soluble or water-dispersible polymer containing a carboxyl group, and a side chain of the formula 1:

$$—X—Y—O{\displaystyle -}(\text{Alk-O})_n—R \quad (I)$$

wherein
   Y is a $C_1$–$C_4$-alkylene unit;
   X is

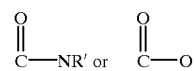

or Y is a single bond and X is a carbonyl group;
   wherein R' is hydrogen;
   Alk is $C_2$–$C_4$-alkylene;
   n is a number from 15 to 60;
   R is hydrogen or $C_1$–$C_{20}$-alkyl;
   wherein said water-soluble or water-dispersible polymer is obtained by free-radical copolymerization of methacrylic acid as monomer A and an ethylenically unsaturated monomer B having said side chain of the formula I and, optionally, a monomer C;

wherein said polymerization is carried out in the presence of at least one polymerization initiator and from 1 to 10% by weight of a phosphorus-containing compound based on a total weight of the monomers;

wherein said phosphorus-containing compound is selected from the group consisting of phosphinic acid, phosphonic acid and salts thereof;

wherein a weight ratio of said monomer A to said monomer B is from 1:9 to 4:6; and wherein the monomer B is selected from the group consisting of a) an ester of a monoethylenically unsaturated $C_3$–$C_6$-monocarboxylic acid with an alcohol of formula II:

                                                       (II)

wherein Y, Alk, n and R are as defined above, p=0 if Y is a single bond and p=1 if Y is $C_1$–$C_4$-alkylene, and b) an amide of a monoethylenically unsaturated $C_3$–$C_6$-monocarboxylic acid with an amine of the formulae III or IIIa:

                                                       (III)

                                                       (IIIa)

wherein Alk' is $C_1$–$C_4$-alkylene and Alk, n and R are as defined above.

2. The mineral building material as claimed in claim 1, wherein the monomer B is an ester of acrylic acid or methacrylic acid with an alcohol of formula II.

3. The mineral building material as claimed in claim 1, wherein n in formulas I, II, III and IIIa is from 21 to 55.

4. The mineral building material as claimed in claim 2, wherein the monomer B is an ester of methacrylic acid with an alcohol of formula II, wherein p=0, Y is a single bond and Alk is 1,2-ethylene.

5. The mineral building material as claimed in claim 4, wherein the monomer B is methylpolyethylenglycolmethacrylate having from 21 to 55 ethyleneoxide units.

6. The mineral building material as claimed in claim 1, wherein the polymerization is carried out in water or in a mixture of water and a water-miscible solvent in the presence of a water-soluble polymerization initiator.

7. The mineral building material as claimed in claim 6, wherein the polymerization initiator is a peroxodisulfate.

8. The mineral building material as claimed in claim 1, wherein the amount of polymerization initiator is from 0.2 to 8 g by weight, based on the monomers to be polymerized.

9. The mineral building materials as claimed in claim 1, wherein the polymer has a weight average molecular weight $M_w$ in the range from 8000 to 100,000 Dalton.

10. A water-soluble or water-dispersible polymer containing a carboxyl group and a side chain of formula I:

                                                       (I)

wherein

Y is a $C_1$–$C_4$-alkylene unit

X is

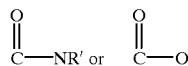

or Y is a single bond and X is a carbonyl group;

wherein R' is hydrogen,

Alk is $C_2$–$C_4$-alkylene, n is a number from 15 to 60,

R is hydrogen or $C_1$–$C_{20}$-alkyl, wherein said polymer is obtained by free-radical copolymerization of methacrylic acid as monomer A and an ethylenically unsaturated monomer B having said side chain of formula I and, optionally, a monomer C;

wherein said polymerization is carried out in the presence of at least one polymerization initiator and from 1 to 10% by weight of a phosphorus-containing compound, based on the total weight of the monomers;

wherein said phosphorous-containing compound is selected from the group consisting of phosphinic acid, phosphonic acid and salts thereof;

wherein a weight ratio of said monomer A to said monomer B is from 1:9 to 4:6; and wherein the monomer B is selected from the group consisting of a) an ester of a monoethylenically unsaturated $C_3$–$C_6$-monocarboxylic acid with an alcohol of the formula II

                                                       (II)

wherein Y, Alk, n and R are as defined above, p=0 if Y is a single bond and p=1 if Y is $C_1$–$C_4$-alkylene, and b) an amide of a monoethylenically unsaturated $C_3$–$C_6$-monocarboxylic acid with an amine of the formulae III or IIIa

                                                       (III)

                                                       (IIIa)

wherein Alk' is $C_1$–$C_4$-alkylene and Alk, n and R are as defined above.

11. The polymer as claimed in claim 10, wherein the monomer B is an ester of acrylic acid or methacrylic acid with an alcohol of formula II.

12. The polymer as claimed in claim 10, wherein n in formula I is from 21 to 55.

13. The polymer as claimed in claim 11, wherein the monomer B is an ester of methacrylic acid with an alcohol of formula II, wherein p=0, Y is a single bond and Alk is 1,2-ethylene.

14. The polymer as claimed in claim 13, wherein the monomer B is methylpolyethylenglycolmethacrylate having from 21 to 55 ethyleneoxide units.

15. The polymer as claimed in claim 10, wherein the polymerization is carried out in water or in a mixture of water and a water miscible solvent in the presence of a water-soluble polymerization initiator.

16. The polymer as claimed in claim 15, wherein the polymerization initiator is a peroxodisulfate.

17. The polymer as claimed in claim 10, wherein the amount of polymerization initiator is from 0.2 to 8% by weight, based on the monomers to be polymerized.

18. The polymer as claimed in claim 10, wherein the polymer has a weight average molecular weight $M_w$ in the range from 8000 to 100,000 Dalton.

19. A process for preparing the water-soluble or water-dispersible polymer as defined in claim 10, comprising:

free-radical copolymerizing methacrylic acid as monomer A and an ethylenically unsaturated monomer B having a side chain of the formula I and, optionally, a monomer C;

wherein said copolymerizing is carried out in the presence of at least one polymerization initiator and from 1 to 10% by weight of a phosphorus-containing compound, based on a total weight of the monomers;

wherein said phosphorus-containing compound is selected from the group consisting of phosphinic acid, phosphonic acid and salts thereof, wherein a weight ratio of said monomer A to said monomer B is from 1:9 to 4:6; and wherein the monomer B is selected from the group consisting of a) an ester of a monoethylenically unsaturated $C_3$–$C_6$-monocarboxylic acid with an alcohol of the formula II

  (II)

wherein Y, Alk, n and R are as defined above, p=0 if Y is a single bond and p=1 if Y is $C_1$–$C_4$-alkylene, and b) an amide of a monoethylenically unsaturated $C_3$–$C_6$-monocarboxylic acid with an amine of the formulae III or IIIa

  (III)

  (IIIa)

wherein Alk' is $C_1$–$C_4$-alkylene and Alk, n and R are as defined above.

20. The process as claimed in claim 19, wherein the monomer B is an ester of acrylic acid or methacrylic acid with an alcohol of formula II.

21. The process as claimed in claim 19, wherein n in formula I is from 21 to 55.

22. The process as claimed in claim 20, wherein the monomer B is an ester of methacrylic acid with an alcohol of formula II, wherein p=0, Y is a single bond and Alk is 1,2-ethylene.

23. The process as claimed in claim 22, wherein the monomer B is methylpolyethylenglycolmethacrylate having from 21 to 55 ethyleneoxide units.

24. The process as claimed in claim 19, wherein the polymerization is carried out in water or in a mixture of water and a water miscible solvent in the presence of a water-soluble polymerization initiator.

25. The process as claimed in claim 24, wherein the polymerization initiator is a peroxodisulfate.

26. The process as claimed in claim 19, wherein the amount of polymerization initiator is from 0.2 to 8% by weight, based on the monomers to be polymerized.

27. The mineral building material according to claim 1, wherein said polymer is a copolymer of methacrylic acid and methylpolyethyleneglycol methacrylate.

28. The mineral building material according to claim 27, wherein said copolymer has about 22 ethyleneoxide repeating units.

29. The mineral building material according to claim 28, wherein a weight ratio of methacrylic acid to methylpolyethyleneglycol methacrylate is about 2:8.

* * * * *

UNITED STATES PATENT AND TRADEMARK OFFICE
CERTIFICATE OF CORRECTION

PATENT NO. : 6,384,111 B1
DATED : May 7, 2002
INVENTOR(S) : Kistenmacher et al.

It is certified that error appears in the above-identified patent and that said Letters Patent is hereby corrected as shown below:

<u>Title page,</u>
Item [75], Inventors, should read:
-- [75]  Inventors:    Axel Kistenmacher, Ludwigshafen;
                       Paul Klingelhoefer, Mannheim;
                       Johannes Perner; Markus Hartmann,
                       both of Neustadt; Alfred Ruland,
                       Schriesheim, all of (DE) --

Item [22], the PCT Filing Date should read:
-- [22]  PCT Filed:    Dec. 19, 1997 --

Signed and Sealed this

Fifteenth Day of October, 2002

*Attest:*

JAMES E. ROGAN
*Attesting Officer*          *Director of the United States Patent and Trademark Office*